United States Patent [19]

McIlwain

[11] 4,121,475
[45] Oct. 24, 1978

[54] TENSION CONTROL DEVICE

[75] Inventor: Irwin D. McIlwain, Lancaster, Pa.

[73] Assignee: Sperry Rand Corporation, New Holland, Pa.

[21] Appl. No.: 817,881

[22] Filed: Jul. 21, 1977

[51] Int. Cl.² ............................ F16H 7/10; F16H 7/12
[52] U.S. Cl. ........................ 74/242.15 R; 74/242.11 R
[58] Field of Search ...................... 74/242.15 R, 242.8, 74/242.1, 242.11 R

[56] References Cited
U.S. PATENT DOCUMENTS

| 1,808,588 | 6/1931 | Allen | 74/242.1 R X |
| 4,059,022 | 11/1977 | Fawcett et al. | 74/242.15 R X |

FOREIGN PATENT DOCUMENTS 1,450,762  3/1969  Fed. Rep. of Germany .... 74/242.15 R Primary Examiner—Leonard H. Gerin
Attorney, Agent, or Firm—John B. Mitchell; Frank A. Seemar; Ralph D'Alessandro

[57] ABSTRACT

A tension control device is disclosed which is particularly well suited to chain drive systems subjected to cyclic forces. The device includes a tension-setting adjustment mechanism affixed to a pivoted mounting plate and an arm means pivoted at one end, at the same location as said mounting plate, supporting a sprocket for engagement with the chain. Biasing and stop means coact with the mounting plate and the arm means to urge them apart and limit the maximum and minimum separation therebetween.

8 Claims, 3 Drawing Figures

TENSION CONTROL DEVICE

BACKGROUND OF THE INVENTION

This invention relates generally to chain tensioning apparatus, and specifically to such apparatus suitable for use with the chain drive system of a hay baler.

Modern balers are rather complex pieces of machinery which translate rotary input power into numerous other timed rotary and reciprocal movements. In many baler designs, particularly the class of baler described herein, it has been found most advantageous and efficient to transfer timed rotary to rotary power through a chain and sprocket arrangement.

In most applications there are very few problems encountered with chain drive systems; however, the power stroke of a baler plunger subjects the drive to cyclic forces which tend to cause the chain to flex and thereby skip teeth on one or more of the sprockets. Also, it is not altogether uncommon for the flywheel shear bolt to fail and cause the chain drive to temporarily, though violently, reverse its direction and cause slack in the normally taut portion of the chain. For whatever reason such may occur, any change in the relationship between a timing chain and its supporting sprockets can be very inconvenient and potentially damaging to the equipment.

Prior art devices for maintaining tension on baler chain drives have proved unsatisfactory in many instances because of the cyclic loading characteristics described. Unless the varying forces can be absorbed, with the simultaneous maintenance of tension, the chain will either skip or damage the rigidly held tensioning device. The instant invention is directed to a device which overcomes the inadequacies of the prior art and effectively improves the overall operational characteristics of a baler.

SUMMARY OF THE INVENTION

It is an object of this invention to provide an improved tensioning device for cyclically loaded chain drive systems.

It is another object of this invention to provide an adjustable tensioning device for cyclically loaded chain drive systems.

It is another object of this invention to provide an adjustable tensioning device for cyclically loaded chain drive systems which is pivotally biased into contact with the chain.

It is another object of this invention to provide an adjustable tensioning device for cyclically loaded chain drive systems which includes stop means to prevent excessive pivoting thereof.

It is a further object of this invention to provide a tensioning device for cyclically loaded chain drive systems which effectively absorbs fluctuations in the chain no matter which direction the chain moves.

It is a still further object of this invention to provide a tensioning device for cyclically loaded baler chain drive systems which is durable of construction, inexpensive of manufacture and extremely effective in use.

These and other objects are obtained according to the instant invention by providing a tension control device which is particularly well suited to chain drive systems subjected to cyclic forces. The device includes a tension-setting adjustment mechanism affixed to a pivoted mounting plate and an arm means pivoted at one end, at the same location as said mounting plate, supporting a sprocket for engagement with the chain. Biasing and stop means coact with the mounting plate and the arm means to urge them apart and limit the maximum and minimum separation therebetween.

BRIEF DESCRIPTION OF THE DRAWINGS

The advantages of this invention will become apparent upon consideration of the following detailed disclosure of the invention, especially when it is taken in conjunction with the accompanying drawings wherein.

DESCRIPTION OF THE PREFERRED EMBODIMENTS

Figure 1:
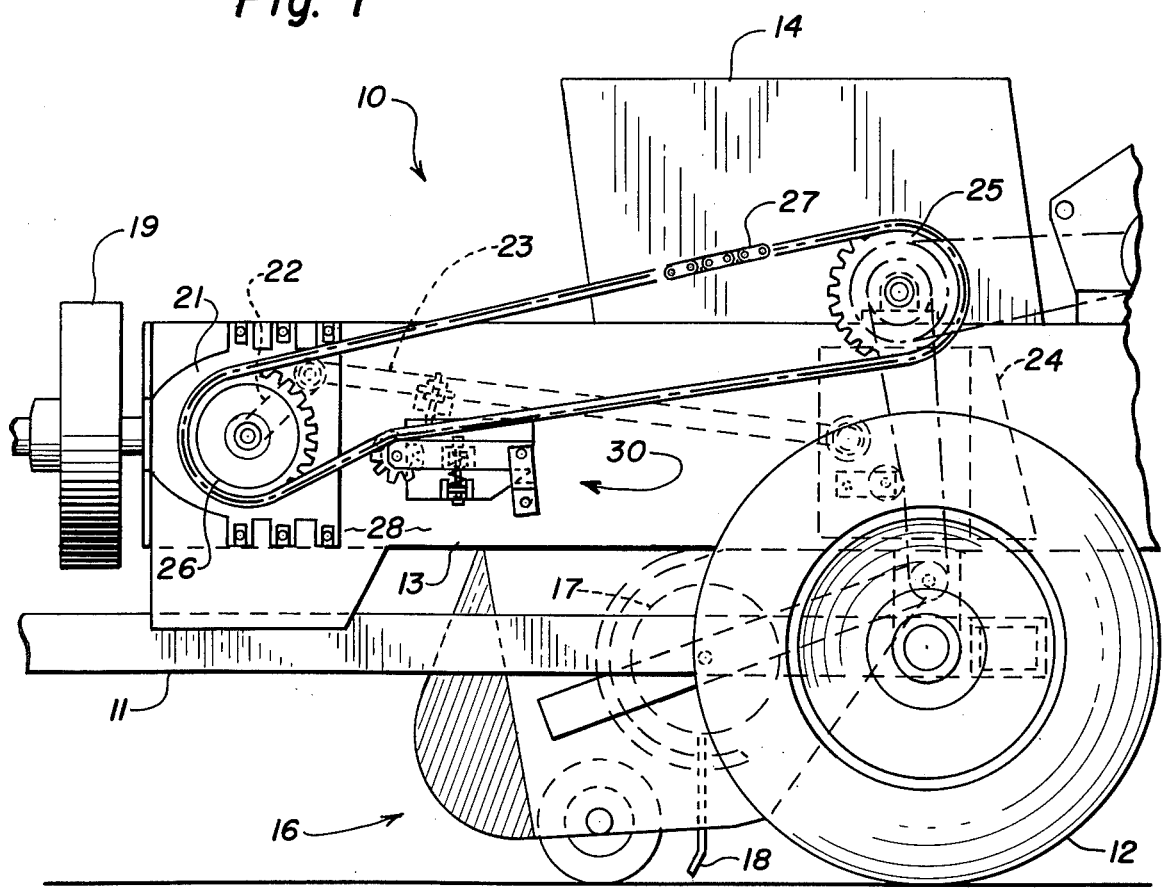
FIG. 1 is a side elevational view of a baler, in partial cross section, showing the tensioning device of the instant invention and the general environment of its intended use.

Hay balers are well known agricultural implements which are distributed by a number of manufacturers. While most balers operate on the same general principles, there are many specific variations in functional design which set them apart one from another. The invention to be described below finds broad utility, but is particularly useful in hay balers which employ chain drives as their main mechanism for power transfer.

The hay baler shown generally at 10, includes a main structural frame 11 supported for movement along the ground by a pair of outboard wheels only one of which, 12, is shown. Frame 11 includes a forwardly extending tongue and hitch (not shown) to facilitate affixment to a tractor or the like. A substantially rectangular elongate bale case 13 is fixed to one side of the frame 11 and extends generally fore-and-aft along the axis of travel.

Though not shown completely in the instant drawings, this well known baler design further includes an infeed housing 14 which is generally perpendicular to the bale case 13 and in material flow communication therewith. A crop pickup mechanism 16, extending below and substantially parallel to infeed housing 14, includes a rotating drum-like element 17 with a multiplicity of radially extending spaced apart tines thereon, only one of which, 18, is shown. The pickup mechanism 16 picks up crop material from the ground and deposits it in the infeed housing 14. Within housing 14 there is located a movable feed assembly (not shown) which transfer the crop material into the bale case 13.

Rotary power is transferred from the pulling vehicle to a main flywheel 19 which is, in turn, operably connected to a gearbox 21. The gearbox has two outputs, the first of which is connected to rotating crank arm 22. A bar 23 is pivotally connected at one end to crank arm 22 and to plunger 24 at the other. The plunger reciprocates within bale case 13 due to the rotation of crank arm 22 to form the crop materials into individual bales for ejection through the discharge end (not shown) of the bale case. The second output of gearbox 21 is rotatably connected to sprocket 26. An endless chain 27 is operably engaged with sprocket 26 and another sprocket 25 to transfer the rotary power from the gearbox to the latter sprocket. Sprocket 25 is operably conncected to means (not shown) for further transfer of the rotary power for operation of infeed and pickup mechanisms. As should be understood, chain 27 is, in addition to being a primary power transfer device, a mechanical means for maintaining a timed operation between the plunger 24 and the other operating elements.

On the outside wall, 28, of the bale case 13 there is mounted a tension control device 30 for chain 27 which is the primary mechanism of the instant invention.

Tension control device 30 will be described with reference to its three major components, i.e., mounting member 31, primary adjustment mechanism 41 and pivot arm mechanism 51. These three major components are assembled to provide an adjustable tension control device which is capable of absorbing the cyclic forces described above without allowing the chain 27 to skip or otherwise change its timed relationship with gearbox 21.

Figure 3:
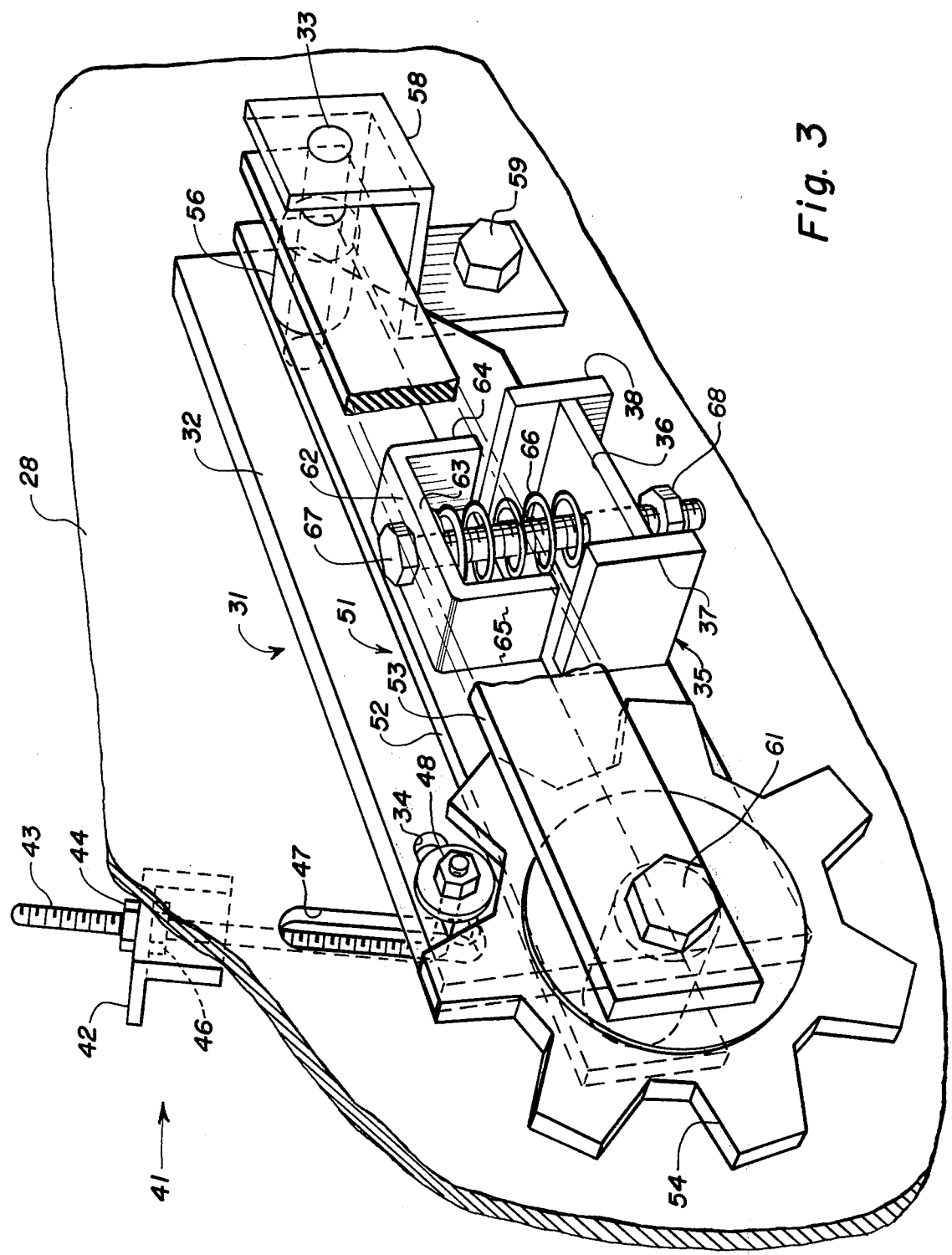
FIG. 3 is a perspective view, in partial cross section, of the device as shown in FIG. 3.

Referring now primarily to FIG. 3, it can be seen that the mounting member 31 comprises an elongated semi-rectangular plate 32 pivotally affixed to bale case side panel 28 by a pivot pin 33 which extends through plate 32 and protrudes therefrom. An elongated substantially horizontal slot 34 is formed through plate 32 at the end thereof remote from pivot pin 33. The purpose of the slot 34 will be explained in more detail below.

A bracket 35 is rigidly fixed to plate 32 and extends substantially perpendicularly away therefrom. The bracket is shown to be substantially H-shaped for strength, but importantly includes a horizontal portion 36 and two substantially parallel upright side members 37 and 38. Bracket 35 interacts with bracket 62 in an important manner which will be described further.

The primary adjustment mechanism 41 is connected between panel 28 and mounting member 31 to thereby control the amount of pivot of plate 32 about pin 33. An L-shaped bracket 42 has one leg thereof rigidly fixed to the back side of panel 28, and the other leg extending substantially perpendicularly therefrom. A threaded rod 43 extends through a hole in bracket 42 and is adjustably located relative thereto by a pair of opposing nuts 44 and 46. Threaded rod 43 has a substantially 90° bend therein to allow extension thereof through elongate slot 47 in panel 28 and slot 34 in plate 32. A nut 48 affixed to the end of rod 43 to hold plate 32 in a fixed position. In the alternative, a stronger connection between bracket 42 and plate 32 can be made by flattening the lower end of rod 43, drilling a hole therethrough, and inserting a separate bolt through the hole and the slots 47 and 34. Slots 34 and 47 allow rod 43 to be adjusted, and thus plate 32, and simultaneously accommodate the changing radious from pivot pin 33. Slot 47 is positioned in a line substantially tangent to a hypothetical arc taken from pivot pin 33.

Pivot arm mechanism 51 comprises two elongate parallel arms 52 and 53 held in spaced apart relationship by the interposition at one end of a sprocket 54 and a spacer 56 at the other. Arms 52 and 53 also pivot about pivot pin 33. Pin 33 is made stable by a bracket 58 fixed by bolt 59 to panel 28. sprocket 54 is rotatably mounted between arms 52 and 53 by a center bolt 61.

An inverted U-shaped bracket 62 is rigidly fixed between arms 52 and 53 and includes a horizontal portion 63 and two substantially parallel depending side members 64 and 65. Brackets 62 and 35 are positioned and sized such that horizontal surfaces 63 and 36 are substantially one above the other and side members 65-37 and 64-38 are in alignment with each other. A compression spring 66 is positioned between the two brackets and urges them away from each other. A bolt 67 extends through portions 63 and 36 of the brackets in a sliding relationship therewith, and through the coils of spring 66 to substantially fix the spring therebetween. A self-locking nut 68 on the end of bolt 67 provides an adjustment, to be described, between the brackets.

Figure 2:
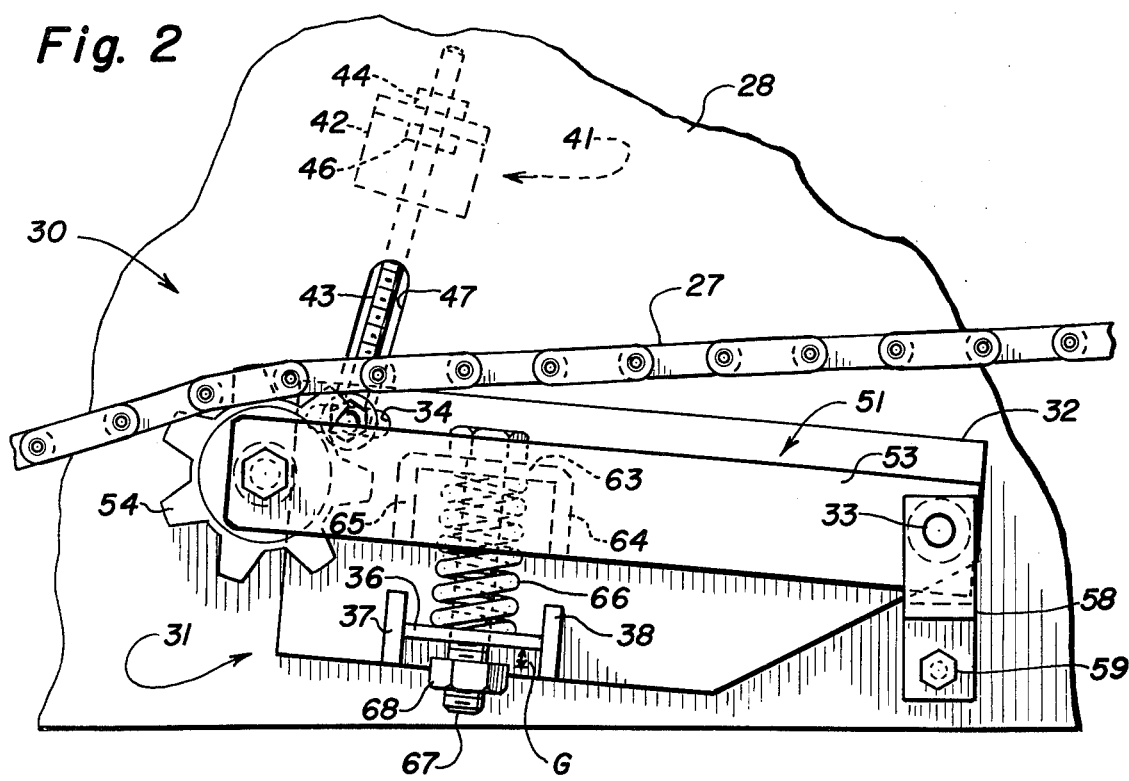
FIG. 2 is an enlarged side elevational view of the tensioning device of the instant invention.

Thus, the tension control device described is affixed to the bale case adjacent the path of travel of the chain drive and biases sprocket 54 into engagement therewith. Initially, spring 66 is compressed by moving brackets 62 and 35 to provide a gap of about three inches therebetween. Nut 68 is next moved into contact with the underside horizontal surface 36. Then, rod 43 is adjusted relative to bracket 42 to move plate 32 and sprocket 54 to provide the desired tension on chain 27. Ideally, the tension is such that an about 1/8 inch spacing (see G in FIG. 2) is created between nut 68 and the underside of surface 36. As the drive forces peak through the chain, arms 52 and 53 pivot downwardly until maximum allowable deflection is reached, i.e., until bracket side members 65-37 and 64-38 contact each other. As the peak forces begin to subside, chain 27 tends to slacken beyond this normal attitude. Gap G controls the reverse deflection of device 31, and allows the sprocket 54 to maintain engagement with chain 27 through that portion of the power transfer cycle. Tension is constantly maintained on the chain and thus the possibility of skipping is eliminated. The adjustments described are adequate also to maintain chain timing integrity even in the event of sudden reversal of chain direction due to the failure of a shear pin.

It will be understood that various other changes of the details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention.

Having thus described the invention, what is claimed is:

1. In a drive system subject to cyclic forces wherein an endless chain is supported in a first plane between at least two spaced apart sprockets, an improved tension control device for said endless chain fixed to a plate-like support having a substantially flat surface in a second plane adjacent to and substantially parallel to said first plane, said control device comprising:

a mounting plate pivotally fixed at a first location to the support by a pivot pin, and adjustably fixed thereto by adjustable holding means at a second location spaced from said first location;

arm means having a first end and a second end, said first end pivotally fixed at said first location by said pivot pin for pivotal movement relative to said support and said mounting plate;

a sprocket fixed to said second end of said arm means and rotatably supported thereby in said first plane for engagement with the endless chain; and adjustment means fixed between said arm means and said mounting plate for controlling the relative movement therebetween about said pivot pin, said adjustment means including a first bracket fixed to said mounting plate and including a first plate-like portion extending in a direction substantially perpendicularly to said second plane, a second bracket fixed to said arm means and including a second plate-like portion substantially vertically aligned and parallel with said first plate-like portion of said first bracket, a biasing means positioned between said plate-like portions of said first and second brackets urging them away from each other, and adjustable limit means operable to control the maximum separation between said plate-like portions of said first and second brackets.

2. The device of claim 1, wherein:

said biasing means is a coiled compression spring;

each of said first and second plate-like portions has a hole therethrough, said holes being in substantial vertical alignment; and said adjustable limit means comprises an elongate bolt having a cap on one end and a threaded portion on the other end, said bolt extending through said holes and said compression spring and fixed on said other end by a nut.

3. The device of claim 2, wherein:

said first bracket includes upright means directed toward said second bracket and positioned to contact same when the relative spacing between said first and second brackets reaches a preselected minimum.

4. The device of claim 3, wherein:

said second bracket includes a depending means directed towards said upright means of first bracket and positioned to contact same when the relative spacing between said first and second brackets reaches a pre-selected minimum.

5. The device of claim 4, wherein said arm means comprises:

first and second arm spaced apart and fixed to opposite lateral sides of said sprocket and said second bracket.

6. The device of claim 5, wherein said adjustable holding means comprises:

a third bracket fixed to said support;

a threaded rod having a first end and a second end;

said first end of said rod adjustably fixed to said third bracket; and said second end of said rod adjustably fixed to said mounting plate.

7. The device of claim 6, wherein said support has a first elongate slot therethrough;

said third bracket is on the side of said support opposite said mounting;

said rod is substantially axially aligned with said first elongate slot;

said mounting plate has a second elongate slot therein partially overlapping said first slot; and said rod is fixed to said mounting plate by a bolt extending through said first and second slots.

8. In a baler adapted to move across a field, pick up crop materials, form these materials into a self-contained bale and discharge them, said baler including an elongate bale case having a bale forming chamber, a transverse feeder mechanism, a rotary power transfer mechanism, an endless chain coupling between sprockets on said power transfer mechanism and said feeder mechanisms, an improved tension control device for said endless chain comprising:

a mounting plate pivotally fixed at a first location to the baler by a pivot pin, and adjustably fixed thereto by adjustable holding means at a second location spaced from said first location;

arm means having a first end and a second end, said first end pivotally fixed at said first location by said pivot pin for pivotal movement relative to said baler and said mounting plate;

a sprocket fixed to said second end of said arm means and rotatably supported thereby for engagement with the endless chain; and adjustment means fixed between said arm means and said mounting plate for controlling the relative movement therebetween about said pivot pin, said adjustment means including a first bracket fixed to said mounting plate and including a first plate-like portion extending in a direction substantially perpendicularly to said mounting plate, a second bracket fixed to said arm means and including a second plate-like portion substantially vertically aligned and parallel with said first plate-like portion of said first bracket, a biasing means positioned between said plate-like portions of said first and second brackets urging them away from each other, and adjustable limit means operable to control the maximum separation between said plate-like portions of said first and second brackets.

* * * * *